Patented May 23, 1933

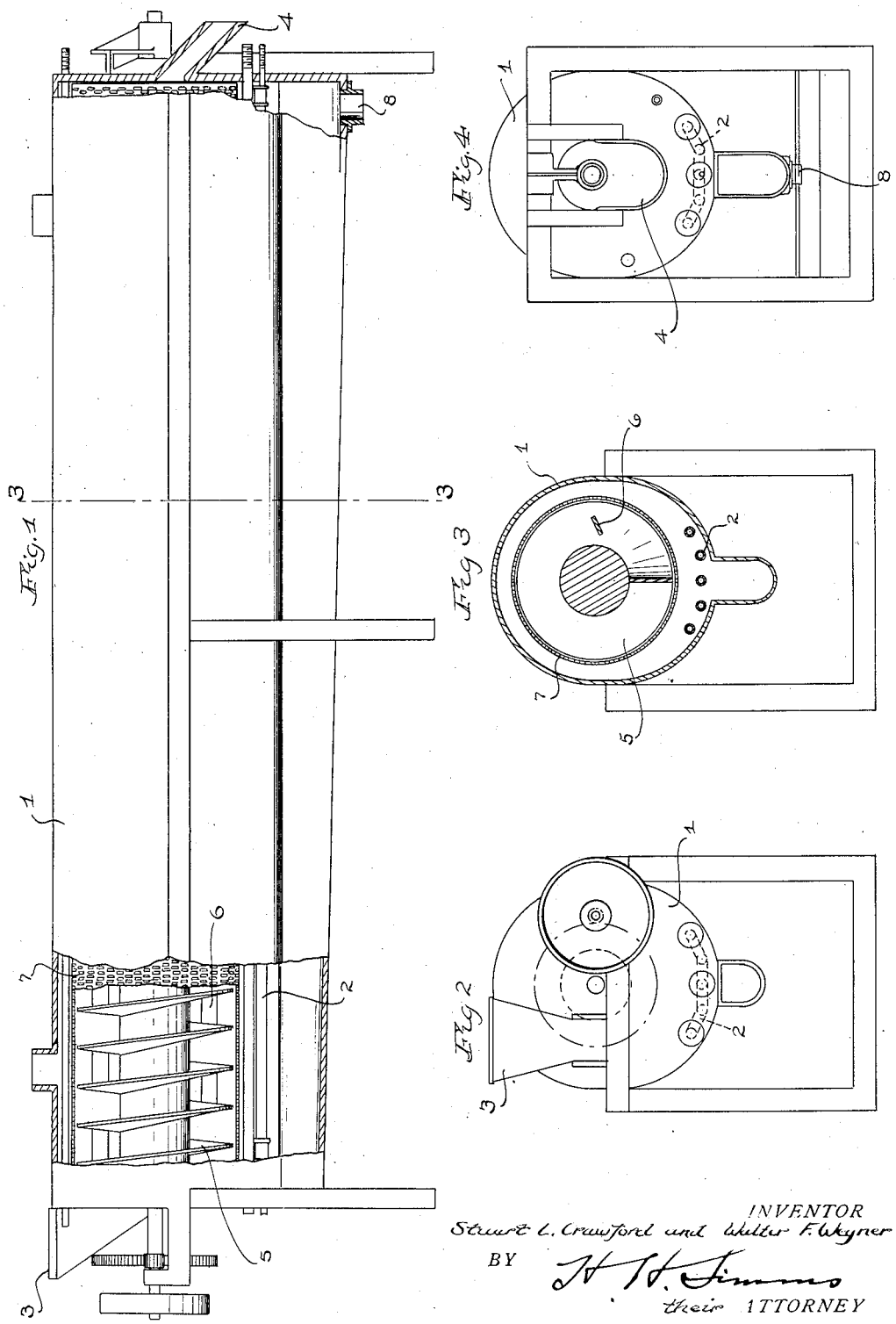

1,910,754

UNITED STATES PATENT OFFICE

STUART L. CRAWFORD, OF ROCHESTER, AND WALTER F. WEGNER, OF EAST WILLIAMSON, NEW YORK; SAID WEGNER ASSIGNOR TO FRUIT BELT PRESERVING COMPANY, OF EAST WILLIAMSON, NEW YORK, A CORPORATION OF NEW YORK

METHOD OF MAKING AND CANNING APPLE SAUCE

Application filed July 24, 1930. Serial No. 470,994.

The present invention relates to a method of cooking fruit, to a method of making and canning apple sauce using such cooking method and to a canned apple sauce made from such methods.

An object of the invention is to provide a fruit cooking method in which the fruit is caused to travel in a continuous manner in a cooking bath in a substantially submerged floating condition free from mass formation and without destroying the original shapes of the fruit pieces so that all pieces of the fruit in the bath are subjected equally to the action of the bath.

Another object of the invention is to provide a process of making and canning apple sauce to obtain a superior sauce at less cost.

Still another object of the invention is to provide an apple sauce which will closely approach the natural fruit in flavor, color and texture.

To these and other ends, the invention consists of the methods and steps as well as an improved article, all of which will be hereinafter set forth and more particularly pointed out in the appended claims.

In the drawing:

Fig. 1 is a side view of an apparatus for carrying out the process, parts being in section;

Fig. 2 is a view of the intake end in elevation;

Fig. 3 is a section on the line 3—3, Fig. 1; and

Fig. 4 is a view of the discharge end in elevation.

This invention contemplates from one aspect the cooking of fruit in a hot syrup bath by causing the fruit to travel from an inlet point to a discharging point and during such travel maintaining the fruit in a substantially submerged but floating condition while at the same time preventing a mass formation of the floating fruit, so that each piece of fruit may absorb approximately the same per cent of sugar syrup and may be subjected substantially to the same degree of heat in order that a uniform cooking of the fruit is obtained.

From another aspect, the invention contemplates the cooking of apples in a syrup bath without breaking up the apple pieces, receiving the pieces from the bath substantially in a drained state which condition is readily controllable, passing the apples while still hot through a strainer to produce a sauce condition, and sealing the sauce in containers before the temperature thereof has been reduced below the desirable canning temperature.

From still another aspect, the invention contemplates the cooking of apple pieces whose seed cells, skins and seeds have not been removed, in a floating condition in a hot liquid bath so that the seed cells and seeds may separate themselves automatically from the pieces, and the skin will be toughened so that it may be separated from the fruit when the pieces are strained to produce the apple sauce.

From a still further aspect, the invention contemplates the production of an apple sauce of superior quality and at less cost.

In carrying out this invention, the apples may be cut up into small pieces, chunks, slices or choppings, without removing the skins, seeds or seed cells, but after removing all stems, blows and soft spots or rotten portions. However, if desired, the apples may be pared, cored and seed celled, and then trimmed to remove any skin, spots or other portions, after which they may or may not be cut into small pieces, chunks, slices or choppings, at any desired time before cooking. The apples may be washed, and in the washing, salt brine may be introduced, as is now common, to prevent enzymatic changes.

The cooking of the apples is effected through a boiling syrup bath, that is, a boiling bath containing sugar of any kind and any other desired flavoring ingredient. The boiling point of this syrup solution will vary with the sugar content of the solution. As an example, there may be used a 60° Balling or Brix syrup which will boil about 218° Fahr. The fruit is held in this syrup solution until sufficiently cooked and impregnated to the proper degree with the syrup, the air of its cells being driven out and the cells filled with the syrup. The time the apples are held in this syrup is important to the production of a good sauce, for, if held in the syrup too short a time, a brown uncooked sauce will be produced, due to enzymatic changes, and if held too long, an overcooked condition will result and a pink sauce may be obtained. As an example, for syrup 60° Balling or Brix at 218° Fahr., the time of cooking should be approximately 1½ to 4 minutes. The time that the apples should stay in the syrup solution depends on the variety of the fruit, the condition of the fruit, including ripeness, the temperature of the fruit, the size of the pieces and the sugar content of the syrup.

It is preferred that the apples should be maintained in the cooking receptacle in such a condition that each piece during the entire cooking action will be surrounded by the hot syrup. In other words, the pieces should not be in a mass, as this prevents complete saturation by the syrup and does not give an equal cooking of the pieces. The apples have a tendency to float in the syrup and collect in a mass at the top of the solution. To prevent this massing action, the apples are moved downwardly into the solution during the entire cooking action so that the mass relationship is destroyed. The mass of apples in the cooker at any one time is considerably less than the mass of syrup so that the massing action of the floating apples may be destroyed.

It has been found that after a certain amount of apples pass through the cooking bath, the syrup becomes saturated with the flavoring constituents of the apples, so that eventually, the syrup does not have a solvent action on said flavoring constituents, with the result that the cooked sauce retains substantially all of its original flavoring constituents. The apple pieces issue from the cooker in a solid and not a mushy condition and separated or drained of any desired amount of the syrup adhering mechanically to the surface of the fruit.

If the apples are chopped up without removing their skins, seeds or seed cells, a greater amount of sauce is obtained and, in addition, the seeds and a large proportion of the seed cells will detach themselves from the apple pieces and then fall by gravity to the bottom of the cooker from which they can be removed in any desired manner. It is known that the pectin content of the flesh of the apple is greatest adjacent the skin, also that the pectin content of the core, exceeds the pectin content of the flesh of the apple farther removed from the skin and core, so that an apple sauce produced from apples without removing the skin or seed cells must ordinarily have a higher pectin content than in the case of apple sauce made in the usual manner from peeled and cored fruit.

After the apple pieces pass from the cooker in a drained condition they are immediately passed to what is known in the trade as a pulper, which is in effect a beater and strainer, and acts to beat the apple pieces into a sauce and pass the latter through a strainer which removes all seeds, seed cells, stems, skins and other extraneous matters not removed by previous steps in the process. The skins are not softened in such manner as to disintegrate, but are really toughened by the syrup bath and come out in a whole condition, thus making their separation from the sauce easier.

After the sauce has been produced, the latter is canned before its temperature goes below canning temperature, the lowest temperature which is approximately 160° Fahr. and which varies with the consistency of the sauce and the variety of the fruit used.

Any suitable cooker may be employed for making the sauce under this process, but that shown in the drawing has been found to be a desirable construction and comprises a drum 1 having suitable heating means, in this instance, in the form of steam coils 2 arranged within the drum near the bottom so that the cooler portion of the syrup in the drum is heated and rises to the top. The inlet 3 of the drum is at one end while the discharge or outlet 4 is at the opposite end, and both so connect with the drum that a large body of syrup is within the drum or cooker. Within the drum is a fixed perforated cylinder 7 in which works a rotary helix 5 which is turned during the cooking to move the apples from the inlet to the discharge. The helix has blades 6 which act on the floating apple pieces to move them downwardly into the mass during their travel through the cooker. Any suitable means may be employed for removing the apple pieces from the cooker at the discharge in a drained condition. The apples may be dropped into the intake by gravity from the chopper or other machine which cuts the apples into pieces. Of course, sugar solution must be fed to the cooker to replace that carried off by the fruit. The sugar solution may be drained from the drum at any desired time by means of discharge pipe 8.

According to this invention, a new method of cooking fruit in a syrup is provided in which the fruit is subjected to a uniform cooking without disintegration. A new method of cooking and canning apple sauce is provided which eliminates waste and provides an increased pectin content in the sauce due to the fact that the seeds, seed cells and skins are not removed prior to the cooking. The seed cells and seeds separate automatically from the fruit while the latter is in the bath, and the skins are toughened so that they will not break into small pieces and may be readily strained from the sauce.

An apple sauce is produced having a flavor closely approaching that of the original fruit and containing to a great degree the original ethereal flavors. The sauce is also free from a scorched or cooked flavor common to apple sauce cooked in the presence of live steam. The sauce has a coarse, grainy or lumpy appearance, with a color closely approaching the natural color of the fruit, and free from the amber or pale yellow color due to caramelization of the sugars in the mixture when subjected to excessive temperature conditions. The sauce has a uniform desired consistency and is comparatively free from the separation of the syrup and the pulp. It is also free from a mushy or salve-like appearance. The sauce is uniformly sweetened by the use of a minimum amount of sugar or sweetening material. The sugar is mainly inverted after the first few minutes of the process, so that the sugar in the sauce consists mainly of levulose and dextrose rather than all cane sugar, thus obtaining a greater sweetening power and superior flavor. The superior sweetening of the sauce is obtained with less sugar and with greater accuracy of control due to the fact that there are only three readily controllable factors to be considered, viz, density of sugar syrup, temperature of sugar syrup and length of time of immersion. The vitamines of the fruit are not exposed to prolonged cooking in the presence of a large volume of air, so that substantially all of the vitamines are preserved.

What I claim as my invention and desire to secure by Letters Patent is:

1. A method of cooking fruit which comprises causing fruit to travel in a submerged floating condition through a hot cooking sugar syrup bath without subjecting the fruit to direct contact with steam and without thinning the syrup bath, during such travel preventing a mass formation of the fruit at the top of the syrup by moving the fruit toward the bottom of the syrup bath, and removing the cooked fruit from the bath substantially with the shape which it had when introduced into the bath, and draining the fruit.

2. The method of cooking fruit which comprises feeding fruit to a hot syrup cooking bath at one point in the bath, the bath being of such density that the fruit will float therein, moving the fruit in the bath to a discharging point without subjecting the fruit to direct contact with steam and without reducing the density of the bath by mixing steam therewith, holding the fruit in a submerged but floating condition in its travel to the discharging point, said moving of the fruit being under conditions to prevent a massing action of the fruit, and removing the cooked fruit from the bath at the discharging point substantially free from liquid drain.

3. A method of making and canning apple sauce comprising cooking the apples in a hot syrup bath in which the apples are held submerged but in a floating condition without subjecting the fruit to direct contact with steam and without reducing the density of the bath by mixing steam therewith, and moving the floating apples downwardly in the hot syrup during cooking to prevent a mass formation at the top of the syrup, removing the apples from the hot syrup bath substantially with the shapes in which they were introduced into the bath and substantially free from syrup drain, crushing the pieces while hot into a sauce condition, and sealing the sauce in containers without reducing its temperature below canning temperature.

4. A method of making apple sauce comprising cooking the apples in a hot syrup bath in which they are in a submerged but floating condition without subjecting the fruit to direct contact with steam and without reducing the density of the bath by mixing steam therewith, moving the apples downwardly in the hot syrup during cooking to prevent mass formation at the top of the syrup, removing the apples from the bath substantially with the shapes in which they were introduced into the bath and substantially free from syrup drain, and crushing the removed pieces to a sauce condition.

5. A method of making and canning apple sauce comprising cooking the apples for a period approximately between 1½ to 4 hours in a 60 degrees Balling or Brix syrup bath at 218 degrees F. so that the apple pieces become substantially saturated with the syrup without subjecting the fruit to direct contact with steam and without reducing the density of the bath by mixing steam therewith, removing the apples from the bath substantially with the shapes in which they were introduced into the bath, when in a relatively drained condition, crushing the cooked syrup saturated apples to a sauce condition while hot and before dropping to a temperature as low as 160 degrees F., and sealing the sauce into containers before its temperature has receded below that desired for canning purposes.

6. A method of making and canning apple sauce which comprises causing the apples to travel in a submerged floating condition through a hot cooking syrup bath without subjecting the fruit to direct contact with steam and without reducing the density of the bath by mixing steam therewith, and during such travel preventing a mass formation of the apples at the top of the bath by moving the apples toward the bottom of the bath, removing the apples from the bath after cooking in a substantially drained condition, crushing the apples while hot to a sauce condition, and sealing the hot sauce in containers before the temperature of the sauce has been reduced below canning temperature.

7. A method of making apple sauce which consists in cutting up the whole apples into pieces without removing the skins, seeds or seed cells, cooking the apples in a hot liquid bath while maintaining a floating condition of the pieces in the bath, during cooking permitting the seeds and seed cells to separate from the apple pieces and settle by gravity in the bath, and removing the floating apple pieces and passing them through a strainer to remove extraneous matter from the sauce.

8. A method of making apple sauce which consists in cutting up the whole apples into pieces without removing the skins, seeds or seed cells, cooking such pieces in a hot syrup bath in a floating condition without materially destroying the shapes of the pieces, and during cooking permitting the seeds and the seed cells to detach themselves from the apple pieces, the seeds and seed cells dropping by gravity to the bottom of the syrup bath, removing the apple pieces and skins from the bath in a drained condition, and straining the removed material to separate the skins and other extraneous matter from the sauce.

STUART L. CRAWFORD.
WALTER F. WEGNER.